July 29, 1969 G. F. WOODWARD 3,458,741
PULSE GENERATOR FOR USE WITH A SPEEDOMETER CABLE
Filed Dec. 28, 1967
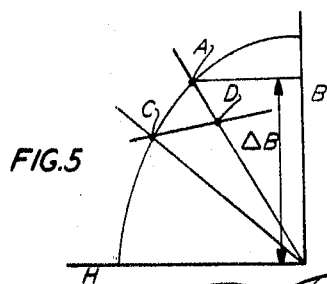
FIG.5
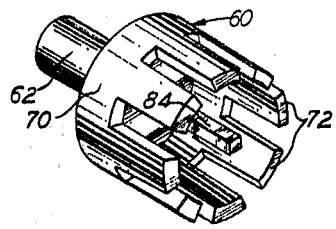
FIG.4
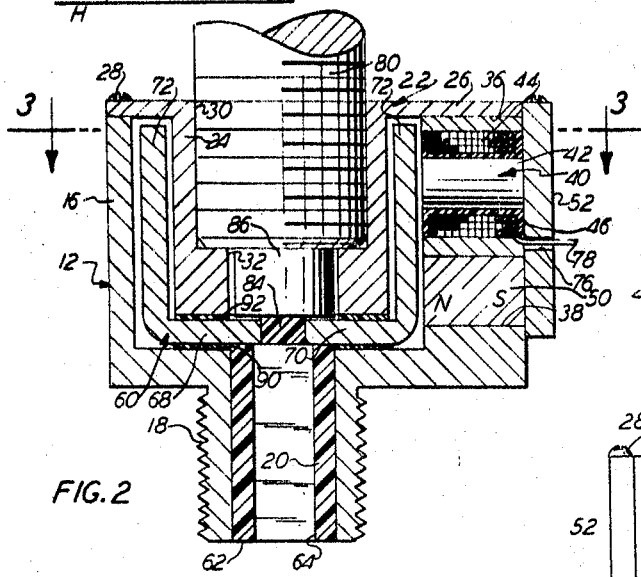
FIG.2
FIG.3
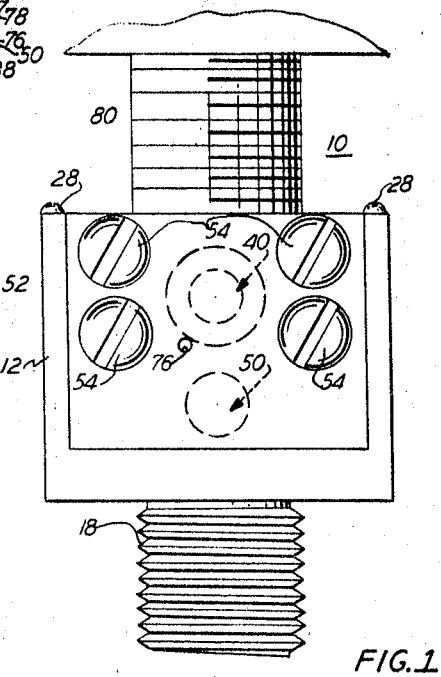
FIG.1
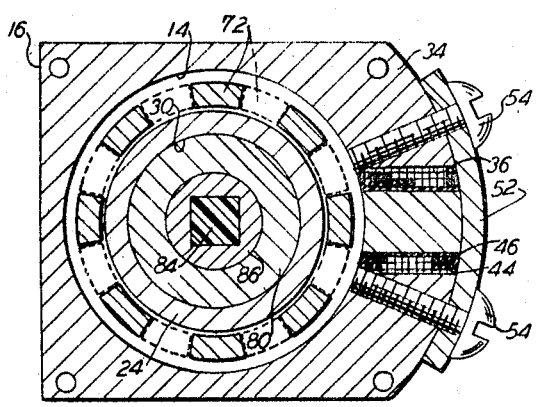
GARY F. WOODWARD
INVENTOR.
BY John R. Faulkner
Keith L. Zurschling
ATTORNEYS United States Patent Office 3,458,741
Patented July 29, 1969

3,458,741
PULSE GENERATOR FOR USE WITH
A SPEEDOMETER CABLE
Gary F. Woodward, Ann Arbor, Mich., assignor to Ford
Motor Company, Dearborn, Mich., a corporation of
Delaware
Filed Dec. 28, 1967, Ser. No. 694,338
Int. Cl. H02k 21/38, 17/42, 19/20
U.S. Cl. 310—155                                    9 Claims

ABSTRACT OF THE DISCLOSURE

A pulse generator for use with a speedometer cable which includes a housing. A rotor having axially extending teeth is positioned within the opening of the housing. The rotor is driven by a shaft which, in turn, is driven by the speedometer cable. The housing is provided with a pair of radially spaced openings. A pickup coil and a permanent magnet are secured within the openings, respectively. A ferromagnetic plate is secured to the outside portion of the housing by ferromagnetic screws which are arranged to align with the spaced teeth of the rotor so that the flux from the permanent magnet can be shunted through the ferromagnetic screws and the plate.

Background of the invention

The present invention is particularly well suited for generating high energy electrical output pulses from a rotor driven by a speedometer cable where it is important that routing problems associated with the pulse generator and the speedometer cable be kept to a minimum.

While prior art electrical or pulse generators are known which are driven by a speedometer cable, they all suffer from the disadvantage that they occupy considerable space, particularly, in an axial direction with respect to this cable. These prior art electrical generators, therefore, do not provide the flexibility necessary for easy use with a speedometer cable.

Summary of the invention

The present invention solves the above mentioned problems by providing a housing constructed of non-ferromagnetic material and having a generally cylindrical opening therein. A rotor having axially spaced teeth is positioned within this cylindrical opening and is adapted to be driven by the speedometer cable. A pair of axially spaced openings are provided in this nonferromagnetic housing and extend in a radial direction with respect to the rotor into the cylindrical housing adjacent the rotor One of these radial openings contains a high energy permanent magnet while the other contains a pickup coil having a ferromagnetic iron core center. A ferromagnetic plate is positioned exteriorly of the nonferromagnetic housing and in contact with both the permanent magnet and the iron core of the pickup coil. As a result, when the rotor which has axially extending teeth extending over a portion of its length is rotated, a flux change is induced in the ferromagnetic core of the pickup coil and time varying flux linkages are coupled to the winding of the pickup coil to thereby generate an alternating current of a particular wave form the winding of the pickup coil. This arrangement conserves space particularly in an axial direction with respect to the speedometer cable thereby providing a pulse generator or pickup device which is particularly suited for use in automotive vehicles.

Additionally, in the invention radially spaced means are provided which extend from the ferromagnetic plate into the cylindrical openings in the nonferromagnetic housing and in a position to shunt the flux of the permanent magnet when the teeth of the rotor are out of alignment with the ferromagnetic core of the pickup coil. This arrangement not only provides a large change in the flux passing through the ferromagnetic core of the pickup coil but it also prevents de-magnetization of a high energy permanent magnet that may be used with the present invention.

As a result, a pluse generator or pickup device is provided which will produce high energy electrical outputs while simultaneously being especially suited for use with a speedometer cable where routing problems are of particular concern.

Brief description of the drawings

FIGURE 1 is a top plan view of the pulse generator or pickup device of the present invention;
FIGURE 2 is a longitudinal sectional view through the pulse generator or pickup device of the present invention with portions thereof shown in elevation;
FIGURE 3 is a cross-sectional view taken along the lines 3—3 of FIGURE 2;
FIGURE 4 is a perspective view of the rotor employed with the present invention; and
FIGURE 5 is a BH curve of the magnetic circuit that is employed with the pulse generator or pickup device of the present invention.

Description of the preferred embodiment

Referring now to the drawings in which like reference numerals designate like parts throughout the several views thereof, there is shown the pulse generator or pickup device of the present invention which is generally designated by the numeral 10. This pulse generator or pickup device includes an external housing part 12 constructed of a nonferromagnetic material, for example, die cast aluminum which has a generally cylindrical opening 14 positioned in the main body portion 16 thereof. The external housing part 12 also is provided with an axially threaded boss 18 having a generally axially extending opening 20 positioned therein.

The pulse generator or pickup device of the present invention also includes a second housing part 22 having a generally axially extending cylindrical portion 24 and a flat cover plate 26 integrally formed therewith. The second housing part 22 is also constructed of a nonferromagnetic material, for example, die cast aluminum and it is affixed to the external housing part 12 by means of a plurality of screws or bolts which are designated by the numeral 28. The cylindrical portion 24 of the second housing part 22 includes an axially extending threaded bore 30 and a smaller, concentric nonthreaded bore 32.

The first housing part 12 includes an enlarged radial portion 34 having a pair of bores or openings 36 and 38 positioned therein which extend in a radial direction with respect to the axis of the generally cylindrical opening 14 positioned in the first housing part 12 and with respect to the threaded bore 30 and the nonthreaded bore 32 positioned within the second housing part 22.

The radially extending opening 36 contains a pickup coil 40 having a ferromagnetic core 42 about which is wound a coil or winding 44 which may be suitably encased in a plastic casing 46. The other radially extending bore 38, positioned in the portion 34 of the first housing part 12, receives a high energy permanent magnet 50 which may be of the metallic type, for example, Alnico. This permanent magnet is polarized in an axial direction with respect to the bore 38 and, therefore, in a radial direction with respect to the cylindrical bore 14 positioned within the housing part 12.

A ferromagnetic backing plate 52 of generally arcuate configuration, as can be seen by reference to FIGURE 3, is attached to the enlarged radial portion 34 by suitable ferromagnetic attaching means that may comprise a plurality of screws 54 which extend through the radially enlarged part 34 of the first housing part 12. These fastening means extend radially inwardly into the generally cylindrical bore 14 of the first housing part 12 and are spaced circumferentially around the cylindrical bore 14 so that they are positioned on either side in the circumferential sense with respect to the pickup coil 40. The purpose and positioning of these fastening means or screws 54 will be explained more fully in a subsequent portion of the specification.

A rotor 60 is positioned within the cylindrical opening 14 in the first housing part 12 and this rotor comprises a cylindrical portion 62 constructed of a self-lubricating, plastic material, for example, Teflon or Delrin, which is rotatably positioned within the axially extending bore 20 in the threaded boss 18. The cylindrical portion 62 has a square, axially extending opening 64 for the reception of a driven shaft of a speedometer cable. The rotor 60 also comprises a generally radially extending flat plate 68 and a generally solid axially extending annular portion 70 which is positioned preferably to receive the magnetic flux of the permanent magnet 50 located in the bore 38. In addition, the rotor 60 includes a plurality of axially extending, integrally formed teeth 72 which extend axially from the solid annular portion 70 and into a position opposite the iron core 42 of the pickup coil 40. The flat plate 68, the annular portion 70 and the teeth 72 are all constructed of a ferromagnetic material. As shown in the drawing, eight of these teeth are provided around the circumference of the rotor but any suitable number of teeth may be provided depending upon the frequency of the alternating electrical energy desired to be generated in the winding 44 of the pickup coil 40. The ferromagnetic backing plate 52 has a small opening 76 positioned adjacent the winding 44 so that output leads 78 from the winding 44 may be threaded therethrough.

The drawing also shows a threaded cylindrical barrel 80 which is adapted to be threaded into the threaded cylindrical bore 30 in the axially extending annular portion 24 of the second housing part 22. This threaded portion 80 may form a portion of a speedometer which ordinarily receives the end of a speedometer cable and is provided so that the speedometer mechanism may be driven through the pulse generator of the present invention. For this purpose, the rotor 60 is also provided with a centrally extending, square, elongated shaft 84 which is positioned within a shaft 86 journalled within the threaded cylindrical barrel 80. The squared shaft 84 may also be constructed of a plastic material.

Additionally, as shown in FIGURE 2, thrust bearing material, preferably in the form of Teflon washers 90 and 92, may be positioned on either side of the flat plate 68 of the rotor and may engage, respectively, the end portion of the first housing part 12 and the end of the cylindrical or annular portion 24 of the second housing part 22.

It can be noted from an inspection of FIGURE 3, that the axes of the radially inwardly extending ferromagnetic housing means 54 that fasten the ferromagnetic backing plate 52 to the portion 34 of the first housing part 12 extend intermediate the teeth 72 of the rotor 60 when one of the teeth, as shown in the drawing, is aligned with the ferromagnetic core 42 of the pickup coil 40. As the rotor 60 is rotated, this tooth 72 comes out of alignment with the iron core 42 of the pickup coil 40 and two of the adjacent teeth 72 will come into alignment with the axes of these fastening means 54 so that the flux from the permanent magnet 50 will be shunted through the fastening means 54 and the ferromagnetic backing plate 52 of the present invention.

In the operation of the present invention, the rotor 60 will be rotated by a rotatable shaft of the speedometer cable that is inserted within the square, elongated opening 64 positioned in the cylindrical portion 62 of the rotor 60. If it is assumed that one of the teeth 72 is in alignment with the iron core 42 of the pickup coil 40, as shown by the solid line position of FIGURE 3, a magnetic circuit is completed from the permanent magnet 50 through the solid annular portion 70 of the rotor 60, through the tooth 72 that is in alignment with the iron core 42, through the ferromagnetic backing plate 52 and, finally, back to the permanent magnet 50. It should be noted that the backing plate 52 is in engagement with the end of the iron core 42 of the pickup coil 40 and the end of the permanent magnet 50 to thereby reduce air gaps and provide as low a reluctance magnetic circuit as is possible. At this time, nearly all of the flux from the permanent magnet 50 passes through the iron core 42 of the pickup coil 40 and thereby links the winding 44.

As the rotor 60 is rotated, the tooth 72 that was in alignment with the iron core 42 of the pickup coil 40 moves into an unaligned position, and the two adjacent teeth come into alignment, as shown in the dotted line position in FIGURE 3, with the radially extending means 54 which, as stated previously, are constructed of a ferromagnetic material. This completes a plurality of parallel magnetic circuits from the permanent magnet 50 through the solid annular portion 70 of the rotor 60, through the two adjacent teeth that are in alignment with the radially extending means 54, through the radially extending means 54, through the ferromagnetic backing plate 52 and back to the permanent magnet 50 thereby shunting substantially all of the flux through the parallel shunting paths described. As a result, there is a negligible amount of magnetic flux passing through the ferromagnetic core 42 of the pickup coil 40 and thus, the flux linking the winding 44 is reduced to a substantially negligible amount. This provides, as shown in FIGURE 5, a very large change in flux designated by $\Delta B$ through the iron core 42 and, thus, produces a large amount of electrical energy in the winding 44. This energy is a product of B times H on the magnetic curve shown in FIGURE 5.

It has also been found that as a result of the shunting of the magnetic flux through the parallel shunting paths previously described including the radially inwardly extending means 54, a de-magnetization of a high energy magnet is prevented thereby keeping the operating point of the magnet at the point A shown in FIGURE 5. If this were not the case, the magnet would be de-magnetized to the point C as shown in this Figure and then as a tooth 72 came back into alignment with the iron core 42, the operating point would move over to point D on the curve shown in FIGURE 5 thereby substantially lowering the amount of electrical energy that is possible to be generated in the winding 44 of the pickup coil 40.

It can be appreciated from the above description that the present invention provides a very high output pulse generator or pickup device adapted for use with a speedometer cable and that it also occupies a minimum of space particularly in an axial direction thereby reducing routing problems that are associated with speedometer cables in automotive vehicles. It has been estimated that this pulse generator or pickup device will occupy only approximately three-fourths of an inch of space in an axial direction for a conventional speedometer cable.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. A pulse generator for use with a speedometer cable and for producing pulses having a frequency proportional to the rotational speed of the speedometer cable comprising, a nonferromagnetic housing, a driven shaft adapted to be connected to the speedometer cable, an opening positioned in said housing of generally cylindrical configuration, a generally annular rotor positioned in said opening in said housing, a plurality of axially extending teeth positioned on said rotor, a first radially extending opening positioned in said housing, a second radially extending opening positioned in said housing, said first radially extending opening being positioned axially from said second radially extending opening in relation to said driven shaft, a permanent magnet positioned in one of said openings and a pickup coil having a ferromagnetic core positioned in the other of said openings, said permanent magnet being polarized in a radial direction with respect to the axis of said driven shaft, and a ferromagnetic plate positioned on the exterior of said housing and in contact with said permanent magnet and the ferromagnetic core of said pickup coil.

2. The combination of claim 1 in which said rotor has a solid cylindrical portion positioned adjacent one of said openings and a plurality of axially extending teeth positioned adjacent the other of said openings.

3. The combination of claim 1 in which said rotor has a solid cylindrical portion positioned adjacent said permanent magnet.

4. The combination of claim 3 in which said axially extending teeth are positioned adjacent said iron core of said pickup coil.

5. The combination of claim 1 in which ferromagnetic means are positioned in engagement with said ferromagnetic plate positioned in engagement with said housing and extend radially inwardly of said housing and into said opening in said housing in a position intermediate the teeth on said rotor when one of the teeth of said housing is in alignment with either the iron core of said pickup coil or the permanent magnet.

6. The combination of claim 5 in which said ferromagnetic means comprise two radially inwardly extending means that are circumferentially spaced about said opening in said housing and said generally annular rotor, the spacing between said teeth being such that said two radially extending means come into alignment with the spaced teeth on said rotor as said rotor is rotated whereby the flux from said permanent magnet is shunted through said two radially extending means and said ferromagnetic means when the teeth of said rotor come into alignment with said two radially inwardly extending means.

7. The combination of claim 6 in which said two radially inwardly extending means comprise radially inwardly extending fastening means for fastening said ferromagnetic plate to said housing.

8. The combination of claim 7 in which said two fastening means are positioned on either side of said iron core of said pickup coil.

9. The combination of claim 8 in which said fastening means comprise screws having spaced centerlines positioned intermediate one tooth on said rotor and adjacent teeth on either side of said rotor when said one tooth is in alignment with the iron core of said pickup coil and said spaced centerlines come into alignment with adjacent teeth of said rotor as said rotor is rotated.

References Cited

UNITED STATES PATENTS

| | | | |
|---|---|---|---|
| 1,423,141 | 7/1922 | Olivetti | 310—155 |
| 1,915,655 | 6/1933 | Eisemann. | |
| 1,957,399 | 5/1934 | Walther. | |
| 1,996,947 | 4/1935 | Beeh | |
| 3,233,128 | 2/1966 | Tyzack | 310—155 |

WARREN E. RAY, Primary Examiner

R. SKUDY, Assistant Examiner

U.S. Cl. X.R.

310—168